United States Patent [19]

Umehara et al.

[11] Patent Number: 5,114,331

[45] Date of Patent: May 19, 1992

[54] APPARATUS OF SHRINKING VOLUMES OF WASTE FOAMED PLASTICS

[75] Inventors: Takeshi Umehara; Toshio Ikeda; Kazuhisa Urata, all of Shizuoka, Japan

[73] Assignee: Suruga Seiki Co., Ltd., Shimizu, Japan

[21] Appl. No.: 645,107

[22] Filed: Jan. 24, 1991

[30] Foreign Application Priority Data

Feb. 9, 1990 [JP] Japan ................ 2-11523[U]

[51] Int. Cl.⁵ ................ B29C 47/10; B29C 47/38
[52] U.S. Cl. ................ 425/200; 425/202; 425/205; 425/209; 425/225; 425/311; 264/37
[58] Field of Search ........... 425/200, 202, 204, 205, 425/207, 208, 209, 225, 311; 264/DIG. 69, 37

[56] References Cited

U.S. PATENT DOCUMENTS

| | | | |
|---|---|---|---|
| 2,991,503 | 7/1961 | Rietz | 425/202 |
| 3,288,443 | 11/1966 | Lynch et al. | 425/378.1 |
| 3,493,031 | 2/1970 | Williams, Jr. et al. | 425/378.1 |
| 3,862,594 | 1/1975 | Stölting et al. | 425/202 |
| 3,954,366 | 5/1976 | Fields | 425/209 |
| 4,078,874 | 3/1978 | Lenhardt, Sr. | 425/202 |
| 4,091,967 | 5/1978 | Knoshita | 425/202 |
| 4,118,164 | 10/1978 | Wenger et al. | 425/202 |
| 4,184,772 | 1/1980 | Meyer | 425/208 |
| 4,223,811 | 9/1980 | Czegledi | 425/208 |
| 4,322,202 | 3/1982 | Martinez | 425/208 |
| 4,415,514 | 11/1983 | Dorrestijn et al. | 425/209 |
| 4,460,277 | 7/1984 | Schulz et al. | 425/202 |
| 4,645,445 | 2/1987 | Takanashi | 425/208 |
| 4,817,517 | 4/1989 | Ammann et al. | 425/200 |
| 4,842,788 | 6/1989 | Johnson | 425/209 |
| 4,854,847 | 8/1989 | Mendoza | 425/209 |
| 4,894,001 | 1/1990 | Petschner | 425/208 |

Primary Examiner—Jay H. Woo
Assistant Examiner—W. J. Matney, Jr.
Attorney, Agent, or Firm—Nields & Lemack

[57] ABSTRACT

The present invention relates to an apparatus for shrinking volumes of waste foamed plastics which have been used as packing materials. The waste plastic materials are thrown into a hopper provided on a crushing room having an opening in an upper part and tapering towards its lower part. A plurality of crushing vanes having a radius of gyration of length reaching within said hopper rotate in said crushing room, to break the foamed plastics into shreds. The broken plastics flow into a sending cylinder through a receipt opening toward the side wall of the crushing room, and are sent forward by screw vanes within the sending cylinder. Subsequently, the waste plastics are compressed in a compression cylinder connected in series to the sending cylinder and further softened and de-foamed by a heating cylinder and exhausted through a nozzle provided at the end of the housing cylinder. Extruded bar like shrinked resins are cut into chips by a rotating cutter and exhausted from the apparatus by air flow.

12 Claims, 8 Drawing Sheets

APPARATUS OF SHRINKING VOLUMES OF WASTE FOAMED PLASTICS

FIELD OF THE INVENTION

The present invention relates to an apparatus of shrinking volumes of waste foamed plastic materials having been used as packing materials.

BACKGROUND OF THE INVENTION

Thermoplastic foamed resins represented by styrene foam or polyethylene foam are light weight, have excellent cushioning property, heating resistance, moisture and chemical proofing. Further, being cheap, they are often used as transporting packings of fresh foods such as fishery products or vegetables, or inner, outer packings and stuffings for transporting electrical instruments, machines, etc.

Those foamed resin products are indeed expedient in use, but are inconvenient after their services because they are very bulky. In addition, being high molecular compounds, if they are burnt as waste materials, high heat is generated and it damages firing furnaces, or causes black smoke and harmful gas. Thus, consignees or receivers of products, articles etc, for example, factories, enterprises, stores and others have had difficulties in treating them.

Fish or vegetable markets where the waste materials of the foamed resins are thrown away, are installed with smelting machines as measures for treating the foamed resins. However, these types of conventional smelting machines have been very large scaled facilities and required the consummation of large quantities of kerosene and, electric power, three to four specialists for perfect smelting and generated offensive odor by thermal decomposition which polluted the environment. Besides, since the treated foamed resins are big lumps of not less than 10 kg in weight, large scaled crushers have to be used in the reproduction process, inviting higher cost.

SUMMARY OF THE INVENTION

The present invention has been devised to remove the above mentioned problems. It is an object of the invention to provide a compact and cheap treating apparatus which may be installed at any desired place, and which shrinks automatically and efficiently volumes of waste foamed resin materials such as styrene foam or polyethylene foam which are thrown thereinto, and alters them into chips and discharges them away.

For accomplishing such an object, the present invention provides a hopper for throwing the foamed plastics in a main body frame which are formed with a crushing room opening in an upper part and tapering downward, rotatably laying a crushing shaft at a center area above the crusting room, and arranging on said crushing shaft a plurality of crushing vanes having radius of gyration of length reaching into the hopper.

At the outside of the crushing room, a sending pipe is provided with receiving means for the crushed foamed plastics, opening toward a side wall of the crushing room. With respect to the sending cylinder, there are in succession disposed a compression cylinder for compressing the plastics, a heating cylinder for heating the compressed plastics to be softened, and an extruding nozzle. The inner side of the compression cylinder has a tapered wall towards its front end, and the inner side of the heating cylinder has a straight cylinder hole corresponding to an exit diameter of the tapered cylinder wall. At the area from the sending cylinder to the end part of the heating cylinder, a rotating shaft is positioned, and it is disposed with a screw vane having an outer diameter in accordance with the shape of the inner side.

An extruding nozzle covers the front end of the shaft of the screw vane, and a rotating cutter is provided thereabout for cutting into chips the resins of shrinked volumes.

At the area of the rotating cutter, an exhausting means is furnished for air-blowing the chipped resins.

Depending upon this structure, only if throwing into the hopper bulky plastics having been used as packing materials or other services, the materials are crushed by the crushing vane in the crushing room and dropped from the receipt into the sending cylinder, and are continuously sent by the screw vane and compressed by means of the tapered wall and the screw vane having a diameter corresponding thereto.

Subsequently, the compressed plastic pieces are heated to a temperature so as not to be heat-decomposed in the heating cylinder, sent to the extruding nozzle as being de-foamed, extruded in elastic forms like hot candy, and expanded by residual air bubbles. Then, the plastics are cut into chips by the cutter which rotates at the outer side of the extruding nozzle, and exhausted outside of the main body frame without splashing by an air flow.

Accordingly, the waste plastics after use are made into small cubes without causing any troubles, and re-utilizations are easy. The sending cylinder, compression cylinder, heating cylinder and extruding cylinder are arranged in series and parallel to the crushing shaft in the outside space of the crushing room tapered downward, so that the apparatus is compact as a whole and does not require a large space.

The receipt of the sending cylinder opens toward the side wall, not the bottom of the crushing room, so that metallic foreign objects such as nails, staples or the like are gathered on the bottom due to their own weights and are prevented from coming into the sending cylinder from the receipt opening.

Since the crushing vane of the crushing room extends at its end into the hopper, the waste plastic materials are destroyed at the lower layer of the cubage without causing bridging phenomena. The crushing vanes shift phases almost equidistantly in the circumferential direction, whereby the cuttings are carried out successively, and the destroyed plastics do not slip nor run idle in the crushing room but are cut at different positions while they are sent in the axial direction of the crushing shaft. Therefore, if the resin is elastic, it is torn into pieces efficiently.

Thus, the inventive apparatus is positioned at a corner of the factories, enterprises or stores, and waste plastics are thrown into the hopper each time they are made, and if operating it at desired times, they may be easily treated.

Other characteristics and merits of the invention will be apparent from under mentioned explanations with the attached drawings. But as far as providing the basic characteristics of the invention, they are not limited to the structures shown in the embodiments.

DETAILED DESCRIPTION OF THE PREFERRED EMBODIMENTS

FIGS. 1 to 5 illustrate one of the embodiments according to the present invention.

The reference numeral 1 designates a frame of a main body, composed of rectangular frame bodies by welding assembled shape steels on a lower frame 1k having casters 1j, 1j. The main body frame 1 has section planes 10a, 10a one of which is biased to one side and the other of which is positioned at a center to extend in width. Both end sides of the section plates 10a, 10a, i.e., the length directions of the frame 1 are covered with cover plates 1c, 1d to define a box shape. The outer side of the section plate 10a may be, as desired, covered with the cover plate 1a. The frame 1 may be of course stationary without using the casters.

Figure 1:
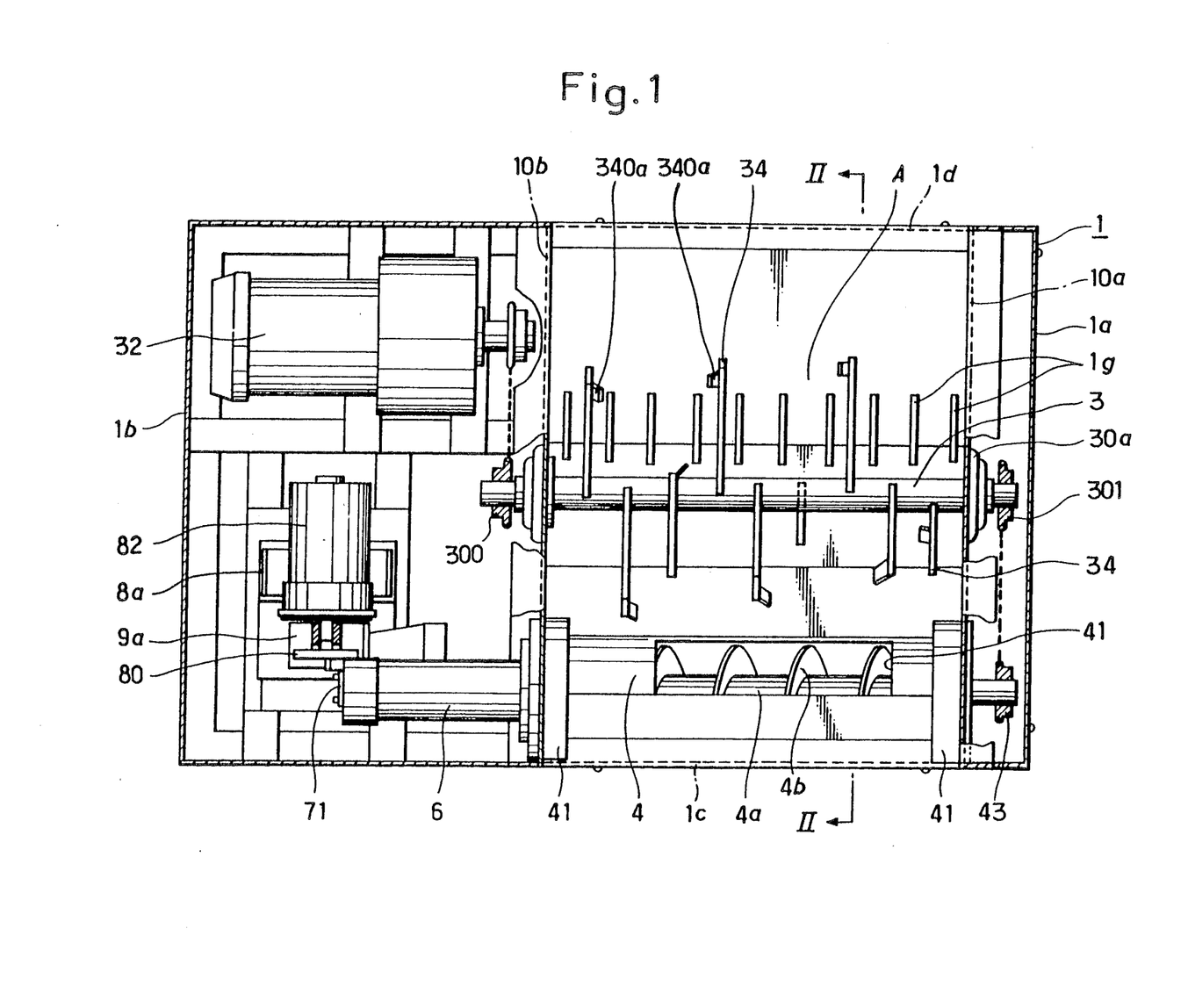
FIG. 1 is a plan view showing an embodiment of an apparatus of shrinking volumes of waste foamed plastic materials according to the present invention.
Figure 2:
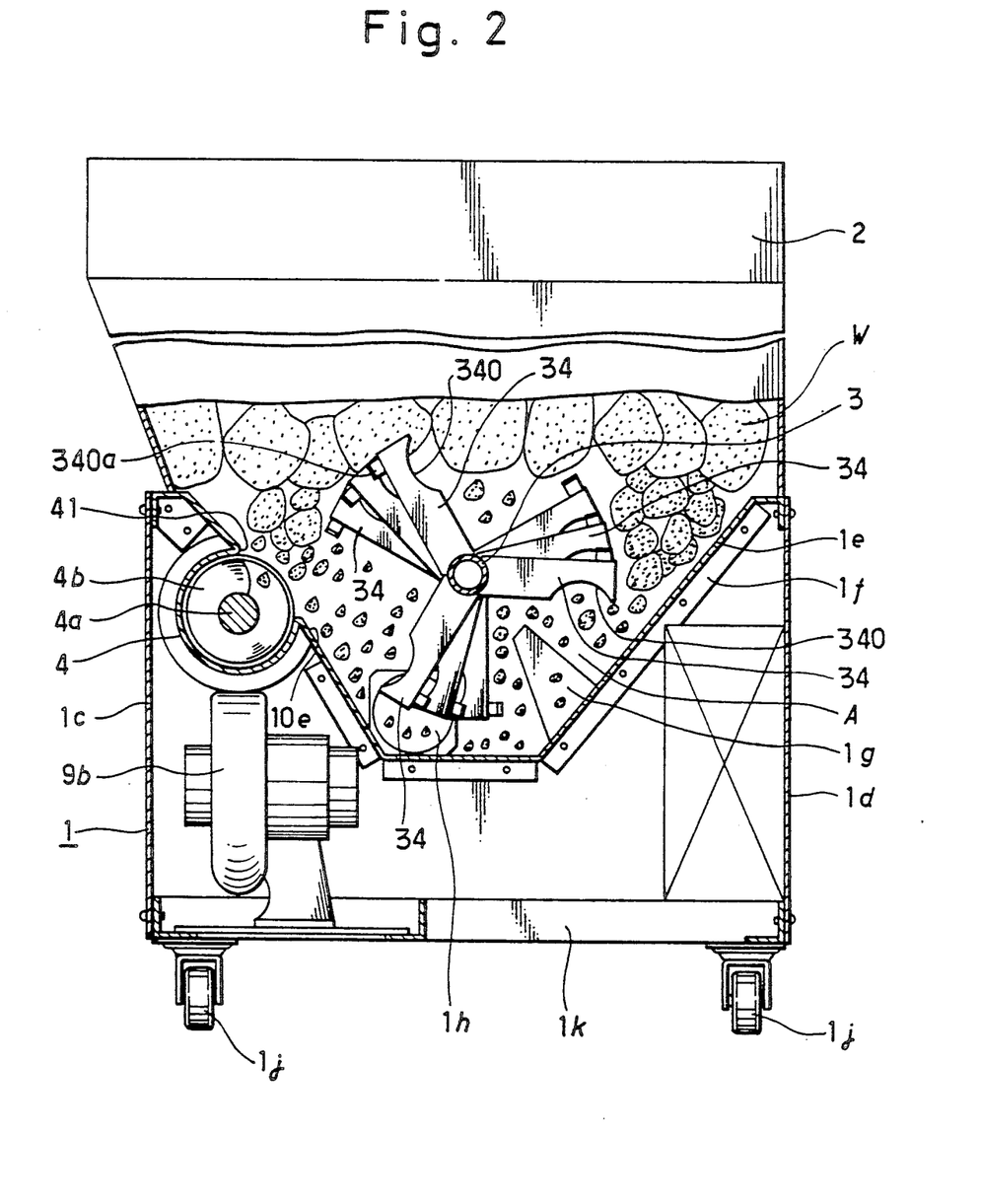
FIG. 2 is a vertically front view along II—II line of FIG. 1.

The part surrounded by the section plate 10a, 10b and the cover plates 1a, 1d is disposed with a guide plate 1e as seen in FIGS. 1 and 2, which is tapered along the bottom and shaped in V-like cross section, and fixed to the section plates 10a, 10b via rigid-reinforcing flange member 1f. Thereby, a crushing room A is constructed, having an opening in the upper part within the main body frame 1. The section plate 10a is provided with a trash output port 1h having an opening cap at a level corresponding to the lower part of the crushing room A.

The reference numeral 2 designates a hopper into which the waste plastics W to be treated are thrown, and which is tapered at its lower opening in accordance with the opening of the crushing room A, and fixedly supported to the frame 1 with a flange.

The reference numeral 3 designates a crushing shaft of a large diameter which traverses through the upper central area of the crushing room A as shown in FIGS. 1 and 2, and is rotatably supported by bearings 30a, 30a furnished in the section plates 10a, 10b. The crushing shaft 3 has a sprocket 300 at its end projection from the section plate 10b as illustrated in FIG. 1, said sprocket 300 being driven by connection, via an endless chain, to a driven sprocket of a motor 32 mounted at the side space outside of the guide plate 1e.

The crushing shaft 3 is axially provided with a plurality of crushing vanes 34, 34 at predetermined spaces. These crushing vanes 34, 34 have lengths not contacting the inner surface of the guide plate 1e and the radius of gyration reaches within the hopper placed above the crushing room A as seen in FIG. 2. In the present embodiment, the crushing vanes 34, 34 make one group of several sheets per about 120° in the circumferential direction and the crushing vanes 34, 34 of each group have phases shifted about 10° to 20° as seen in FIG. 2.

The crushing vanes 34 are formed with cutting edges 340 of semi-circle shape in the rotating direction, while small vanes 340a tilting in one or two sides in the axial direction are provided at opposite sides to the rotating direction of the cutting edges 340. The guide plate 1e is arranged with stationary cutting edges 1g at positions shifting from the positions of the crushing vanes 34, 34.

The reference numeral 4 designates a sending cylinder positioned outside of the guide plate 1e almost parallel to the crushing shaft 3 in plane but lower than it in height. The sending cylinder 4 is fixedly supported to the section plates 10a, 10b by means of flange portions 40, 40 at the both sides, and has an inlet port 41 shaped in the form of a window meeting an opening of an oblique side wall 10e of the guide plate 1e as shown in FIGS. 1 and 2.

Figure 3:
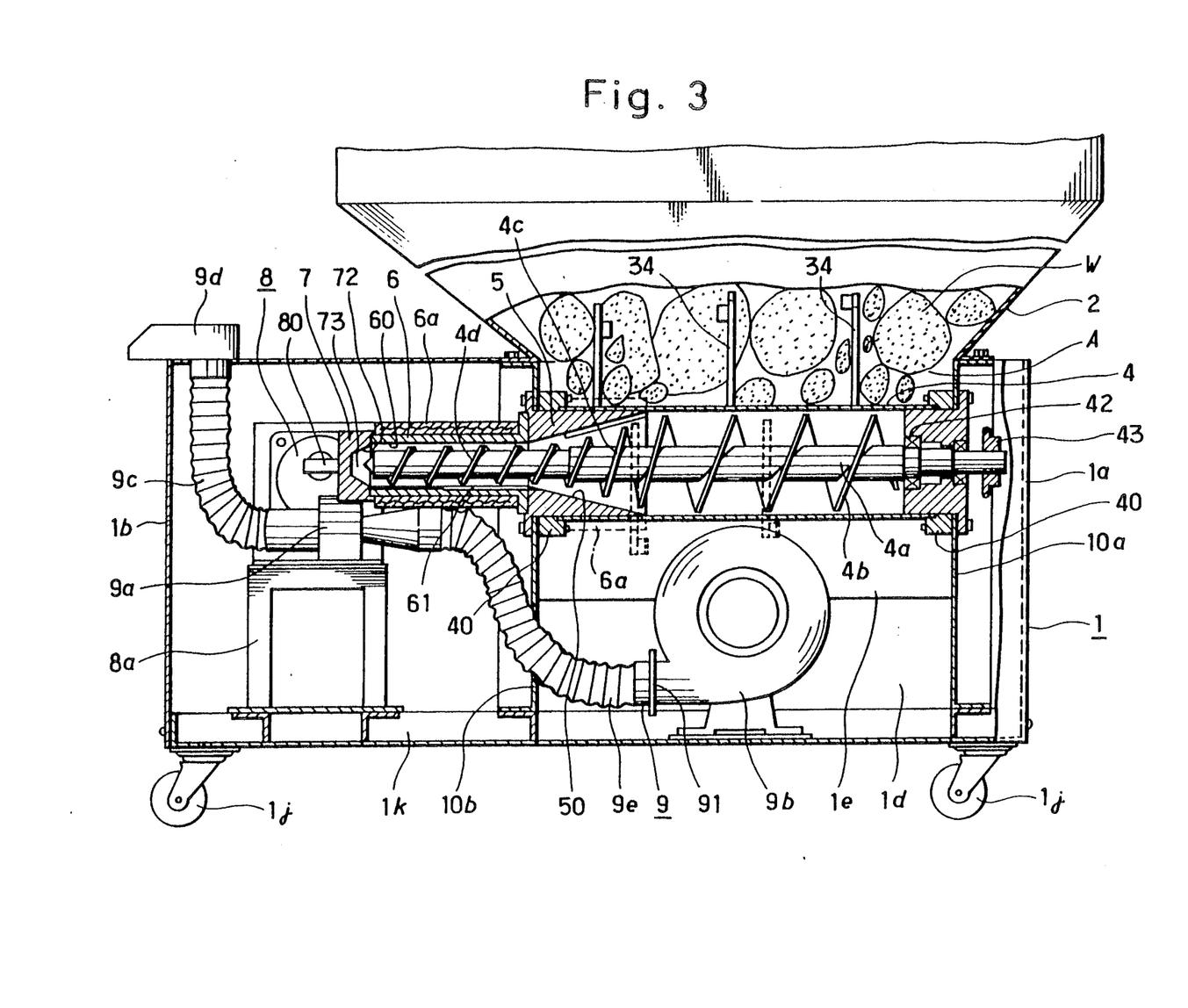
FIG. 3 is a vertical sectional view of the above mentioned embodiment.
Figure 4:
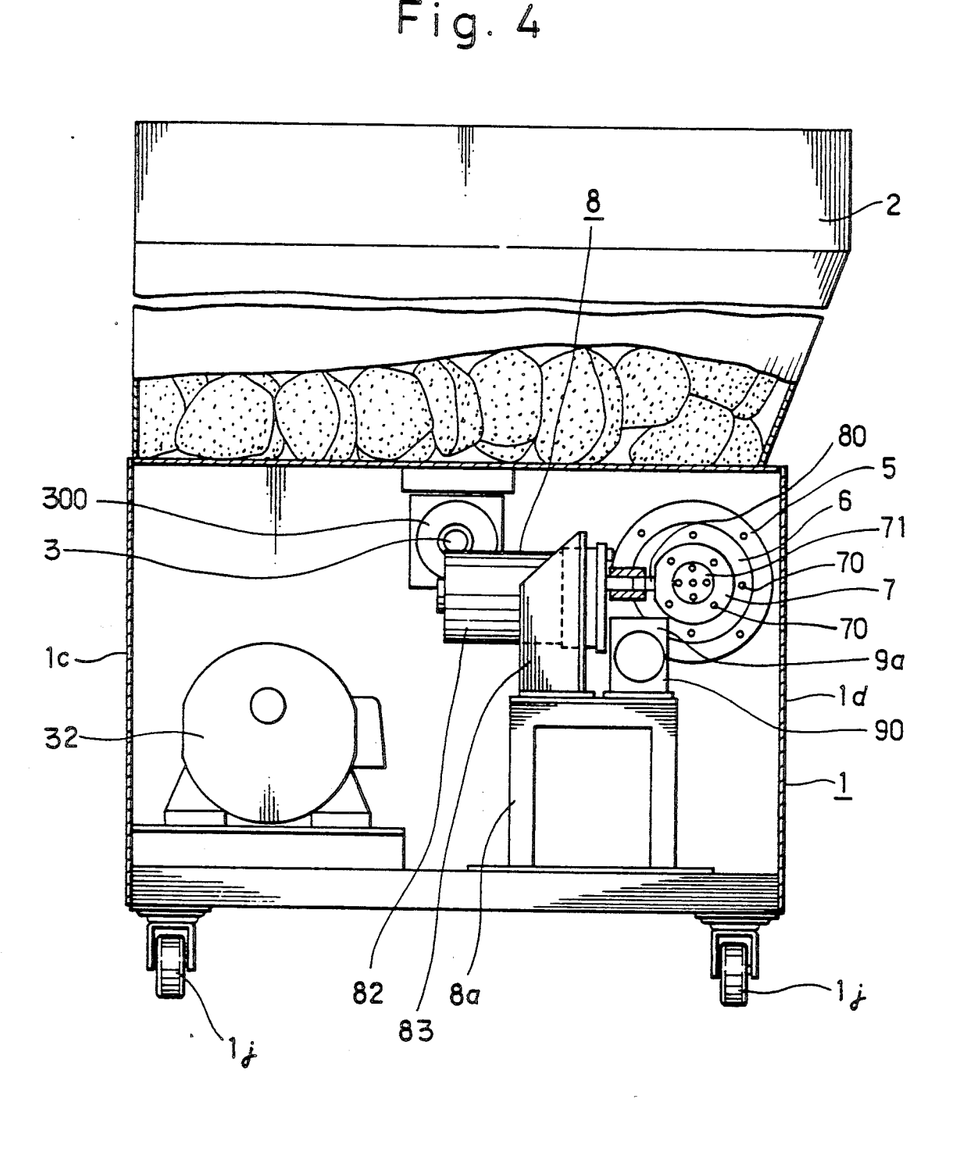
FIG. 4 is a rear view of the same.

The sending cylinder 4 is, as seen in FIG. 3, provided with a bearing mechanism 42, whereby a rotating shaft 4a is side-supported, and is furnished with a sprocket 43 mounted on a shaft end protruding from the section plate 10a. The sprocket 43 may be driven by an exclusive motor other than said motor 32, or may be driven by one drive motor in that a sprocket 301 is provided at the end of the crushing shaft 3 so as to connect to the sprocket 43 via the endless chain.

The rotating shaft 4a extends through the sending cylinder 4 as illustrated in FIG. 3, and is provided on its outer circumference with a sending screw vane 4b of a large diameter and pitch. The sending screw vane 4b continuously becomes a vane portion 4c with a diameter and pitch being reduced at the front end area of the sending cylinder 4. A compression cylinder 5 is secured at the front end of the sending cylinder 4, which has an interior becoming a cylinder wall 50 tapered as going to a front end, and it encircles said vane portion 4c of the reduced diameter. The tapered wall 50 and the vane portion 4c of the reduced diameter continuously compress the crushed plastic pieces sent by the sending screw vane 4b. The rotating shaft 4a is provided with an extruding screw vane 4d at its outer circumference of a farther end part from an exit area of the tapered wall 50 which said vane 4d is smaller in diameter and pitch than the vane portion 4c.

The reference numeral 6 designates a heating cylinder bolted coaxially with the compression cylinder 5. The interior of the heating cylinder 6 is a straight cylinder hole 60 corresponding to the exit diameter of the tapered wall 50, where the screw vane 4d of reduced cross section is inserted.

The pipe hole 60 is preferably formed with grooves 61 axially extending in the several parts on the circumference thereof. The grooves are also formed more preferably in the tapered cylinder wall 50. Depending upon such structures, if the crushed plastic pieces are compressed and increase in density, they do not slip between the pitches of the screw vane 4c, since they are caught by the grooves 61, and although the screw vane 4c is weak in the sending force, it can exactly send them to an extruding disc. But if a heater 6a is furnished at a part corresponding to the outer circumference of the compression cylinder 5 as shown with an imaginary line in FIG. 3, the plastic pieces are warmed and grow sticky, and since the compression load is reduced, they do not slip. In this case, the grooves 61 may be omitted.

A heater 6a as a band type is mounted as a whole or partially on the outside of the heating cylinder 6. The heater 6a heats the foamed plastics at temperatures (generally below 150° C.) lower than the temperature which completely melts the plastics, that is, such temperatures of softening and conglutinating the plastics to one another. On the outer circumference of the heater a heat insulating material is laminated, though not shown.

The reference numeral 7 designates an extruding nozzle of de-foamed and shrinked plastics, which is fixed to the front end of the heating cylinder 6 by bolts 70, and is formed with a concaved face 72 to define an extruding room 73 of a desired volume in relation with the rotating shaft 4a. In this embodiment, the extruding nozzle 7 has an extruding hole 7a (FIG. 5) extending obliquely from the concaved face 72 and opening in the radius direction. In the axial direction of the extruding nozzle 7, a cleaning hole 7b is formed for cleaning cloggings in the extruding hole 7a and is closed by a cover 71.

The reference numeral 8 designates a rotating cutter mechanism for cutting into shreds the extruded, de-foamed and shrinked plastics, comprising a rotating cutter 80 slidable along the outside of the extruding hole 7a, i.e., the outer surface of the nozzle 7 and a cutter motor 82 driving a shaft 81 for supporting the rotating cutter 80. The cutter motor 82 is carried on a supporter 8a provided to the main body frame 1 outside of the section plate 10b. In this embodiment, the shaft 81 is directly driven by the cutter motor 82.

Figure 5:
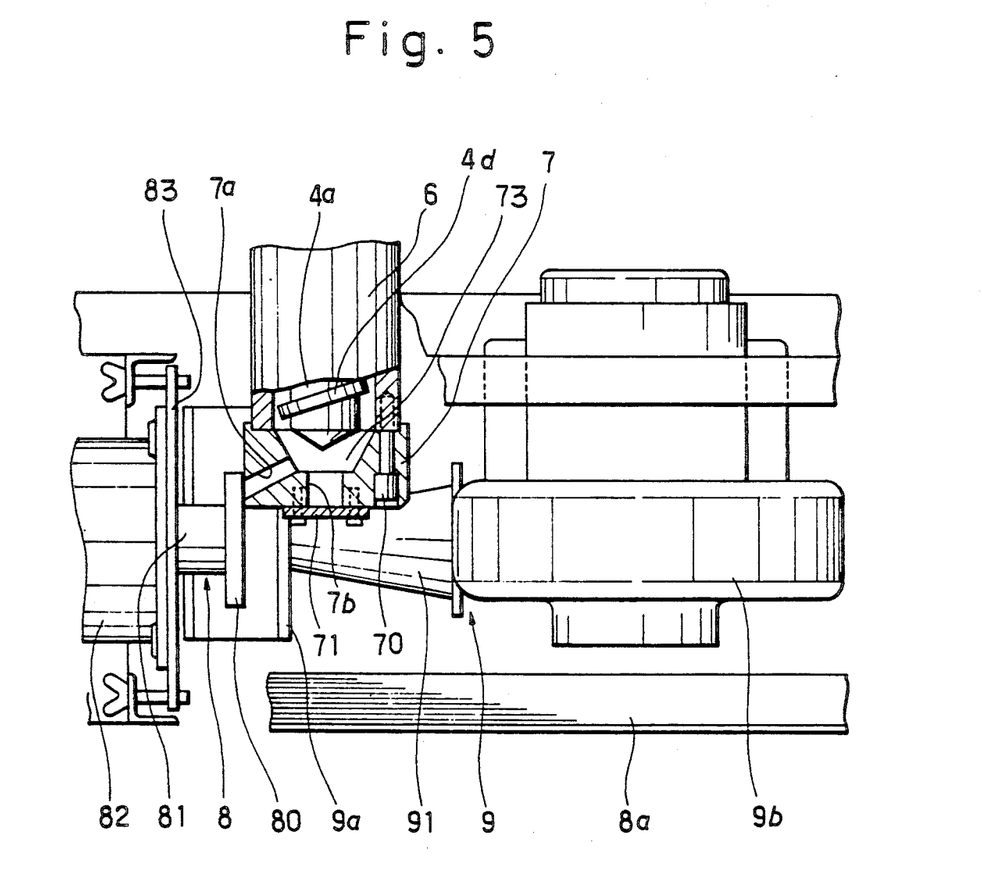
FIG. 5 is a plan view, partially in section, showing an embodiment of a final processing mechanism.

The reference numeral 9 designates an air-exhausting mechanism of the plastic chips, furnished, as seen in FIGS. 3 and 5, with an exhausting hopper 9a positioned under the rotation range of the rotating cutter, and an air blower 9b where a discharge part 91 is directly connected to the exhausting hopper 9a as shown in FIG. 5 or the discharge part 91 is indirectly connected to the exhausting hopper 9a through a hose 9e as shown in FIG. 3, and an exhausting hopper 9c one end of which communicates with the exhausting hopper 9a at the opposite side to the discharge part 91, and the other end communicates with an exhaust nozzle 9d provided to the main body frame. The exhaust nozzle 9d may be communication with a stock means by another hose or the like, or may be communication with the extruding machine. The air blower 9b is, as shown in FIGS. 2 and 3, installed outside of the guide plate 9b and on the main body frame 1 encircled by the cover 1d.

Figure 6:
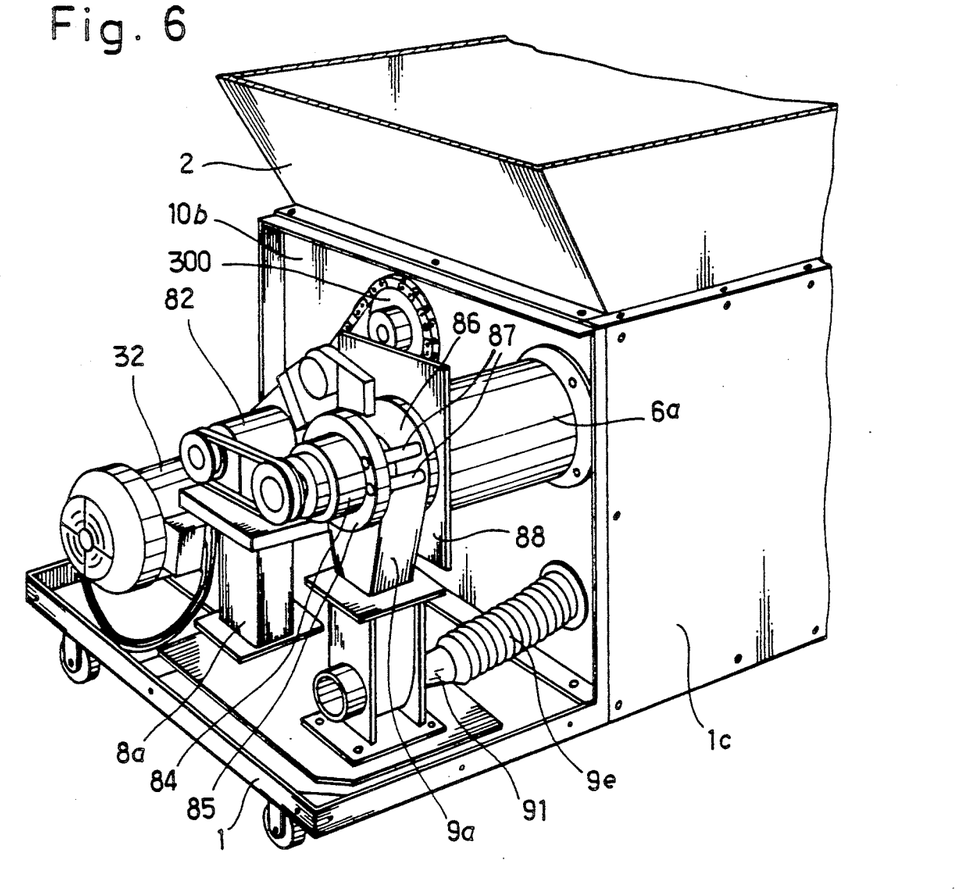
FIG. 6 is a perspective view showing another embodiment of the final processing mechanism.
Figure 7:
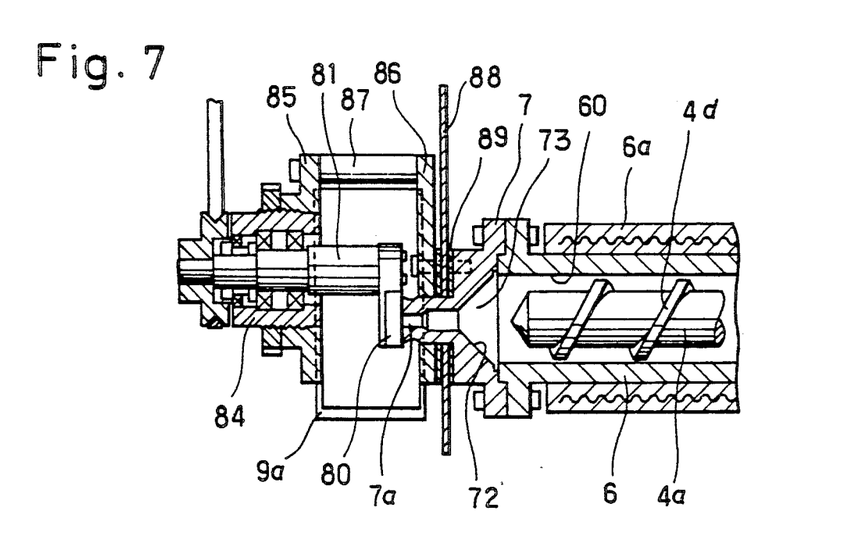
FIG. 7 is a partially cross sectional view of the embodiment of FIG. 6.

FIGS. 6 and 7 illustrate the other embodiment of the extruding nozzle 7 and the rotating cutter mechanism 8. Herein, the extruding hole 7a of the nozzle 7 extends in the axial direction, and the rotating cutter 80 contacts the front end of the nozzle 7. The rotating cutter 80 is biasingly fixed to the shaft 81 which is supported by a bearing unit 84 and is transmitted with the output of the motor 82 carried on the supporting bed 8a.

The bearing unit 84 is fixed with a flange 85 on its outer circumference, which is mounted to a neck 74 of the extruding nozzle 7 and is connected to a bracket 86 via a connection bar 87. A cooling plate 88 is attached via the heat insulating material 87 between the bracket 86 and a main part of the extruding nozzle 7. In this embodiment, the exhausting hopper 9a is shaped in cylinder and installed by the supporting bed 8a, and the discharging part 91 and the end of the exhausting hose 9c are connected to the lower portion of the exhausting hopper.

Figure 8:
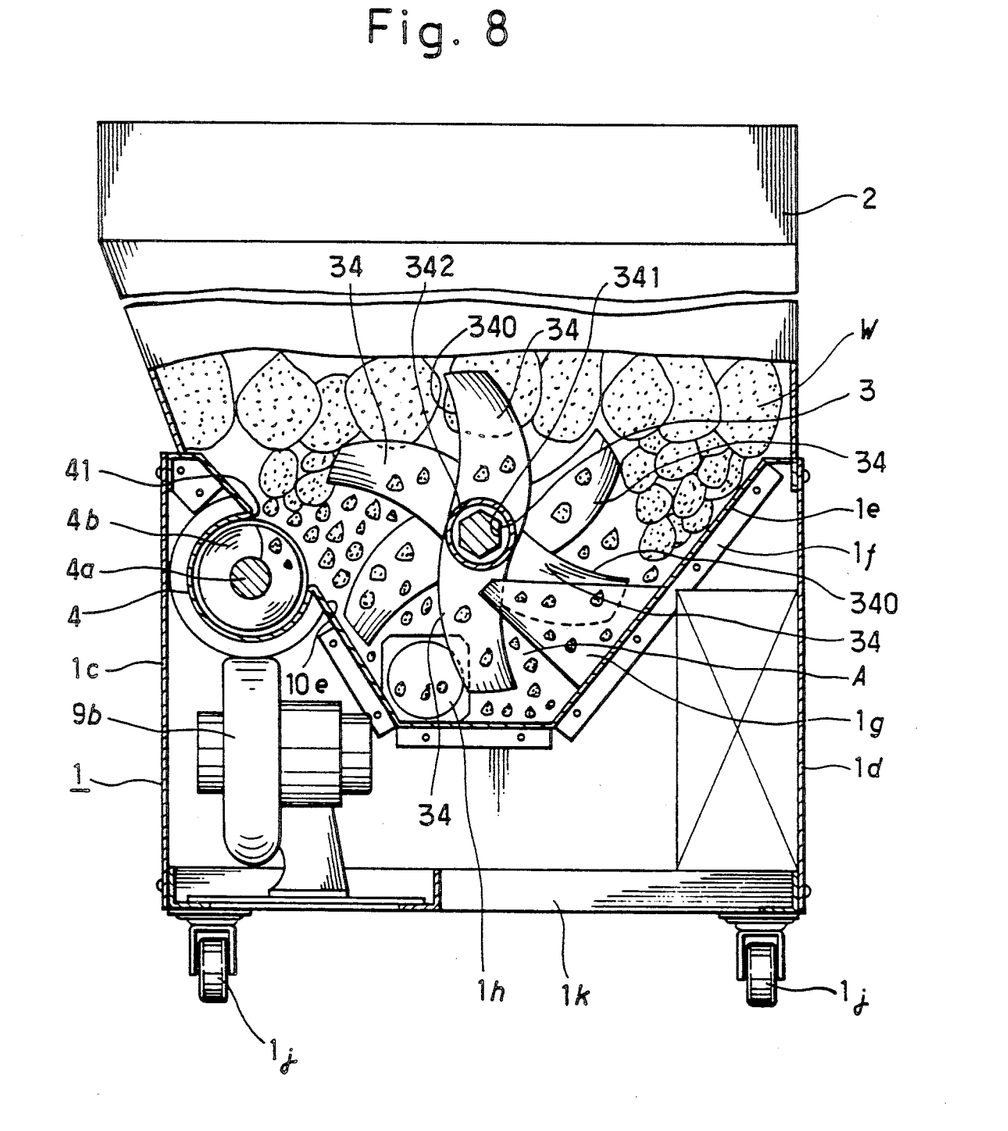
FIG. 8 is a vertically front view showing another embodiment of a crushing mechanism of the present invention.
Figure 9:
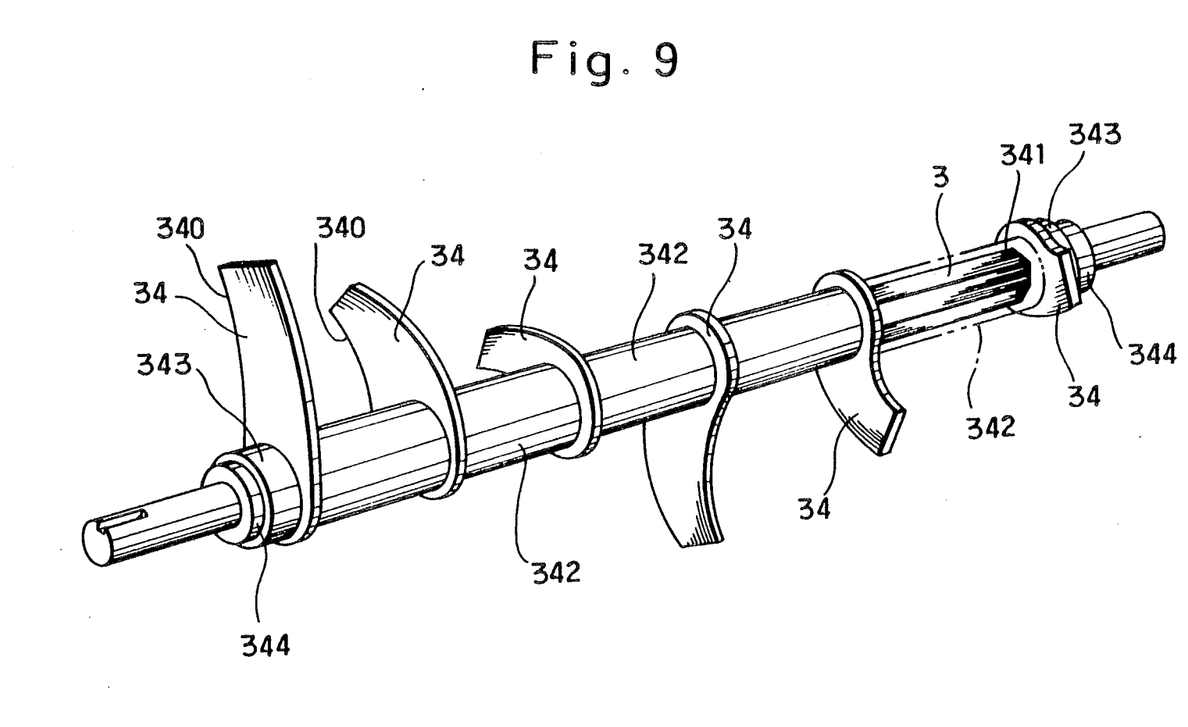
FIG. 9 is a perspective view, partially in section, of the crushing mechanism of FIG. 8.

FIGS. 8 and 9 show the other embodiment. In this embodiment, crushing vanes 34 are six sheets mounted on the crushing shaft 3, successively shifting phases by 60° in the circumferential direction, and each of the crushing vanes 34 has a crescent cutting edge 340.

The crushing vanes 34 may be welded on the crushing shaft 3, but are exchangeable in this embodiment. That is, the crushing shaft 3 is hexagonal in cross section, excluding the both ends, and the crushing vane 34 is formed with a hexagonal hole 341 in its base part, so that the vane 34 is fitted on the shaft 3. A cylindrical spacer 342 is mounted on the outer circumference of the crushing shaft 3, thereby to determine spaces of the vanes 34, and collars 343, 343 are equipped on the shaft 3 at the both outsides of the vanes 34 and are tightened by nuts 344, 344 connecting screws of the crushing shaft 3. A stationary cutting edge 1g is disposed to be in mesh with the crushing vanes 34 in the side of the guide plate 1e, and preferably extends at its end near the collar 343.

In each of the embodiments, the space around the heating cylinder 6a, the rotating cutter mechanism 8 and the discharge mechanism 9 is protected with a detachable cover 1b.

Operation

A further reference will be made to the use and operation of the inventive apparatus.

The apparatus is installed in a place where the waste foamed plastics W are created. For treating them, it is sufficient to throw them as they are into the hopper 2 or destroy them in pieces. The plastics W are charged into the crushing room A and accumulated on the bottom of the guide plate 1e. When the motor 32 is driven under this state, the crushing shaft 3 is rotated to break the plastics W within the crushing room A by means of the crushing vanes 34, 34.

Since the crushing vanes 34, 34 extend within the hopper 2, the plastics W are destroyed at their lower parts without causing bridging phenomena, even though they are closely charged within the crushing room A. The crushing vanes 34, 34 are not only disposed equidistantly on the circumference of the shaft 3, but also disposed by shifting the cutting phases in the circumferential direction. Therefore the cutting is carried out successively, and the broken plastics W do not slip in the crushing room A, but are cut as being sent in the axial direction of the shaft 3. Thus, the plastics are exactly torn in pieces.

If the small vanes 340a oblique in the axial direction are provided in the opposite sides of the crushing vanes, the plastics W are shaken axially of the crushing room while they are brought up, and parts of the plastics not yet broken are cut by the crushing vanes 34, 34.

Further, as seen in the embodiments of FIGS. 8 and 9, if the crushing vanes 34 are in mesh with the stationary cutting edge 1g to make a pair, the plastics are exactly cut into shreds, though they are elastic. In any case, the plastics broken into pieces are charged from the receipt to the sending cylinder.

Since many of the plastic materials W are used as the packing materials, metallic foreign materials such as nails or screws are often included. Having large specific gravity, they drop to the bottom of the guide plate 1e through spaces between the plastics. The receipt opening 41 is higher than the bottom of the guide plate 1e, so that the foreign materials are prevented from being brought into the sending cylinder 4 together with the plastics. Those dropped on the guide plate can be easily taken out from an outlet port 1h of the cover 1a.

The plastics charged in the sending cylinder 4 are sent forward in succession by the screw vane 4b on the rotating shaft 4a. At the front part, the rear end (large diametered side) of the tapered cylinder wall 50 of the compression cylinder 5 opens, and since the cross sectional area is reduced due to tapering, the plastics are compressed as being sent forward by the screw vane of a small pitch, while advancing along the tapered wall 50, and are urged successively into the heating cylinder 6 at appropriate speed as gradually increasing the density.

The interior of the heating cylinder 6 is straight, and the screw vane 4d has a small pushing area so that the sending power is weak, and therefore the compressed plastics are slowly sent forward. During this sending period, the plastics are heated by the heater 6a, and the compressed plastics are conglutinated and sent forward. The front end of the heating cylinder 6 is closed by the extruding nozzle 7 which is transmitted with the heat therefrom. Thus, the plastics are heated, forcibly pressed and kneaded as being further compressed in the extruding room 73, and de-foamed by exothermic heat of the plastics themselves. Thereby, the waste foamed plastic materials are shrinked.

The de-foamed and shrinked materials are like hot chewing cakes and are continuously exhausted from the extruding hole 7a by the pressure transmitted from subsequent waste plastics, and just at the moment of being pushed out, they are expanded by residual air bubbles. Then the cuter motor 82 is driven, and since the cutter 80 rotates at the outside range of the extruding hole 7a, the extruded and shrinked plastic bar are cut at predetermined lengthes.

The cut plastics are dropped into the discharging hopper 9a positioned under the cutter 8, into which the air is sent from the air blower 9b, and the discharge hose 9c is connected to the place opposite to the blowing position, so that the plastic chips are sent on the air in the exhausting hose 9c, and discharged from the discharging nozzle 9d.

In the embodiment shown in FIGS. 6 and 7, the bearing unit 84 supporting the shaft 81 of the rotating cutter 80 is connected to the side of the extruding nozzle 7 by the flange 85 and the connection bar 87. Therefore, although the extruding nozzle 7 is heat-expanded, the relation with the rotating cutter 80 is not changed, and the smooth cutting a may be operated.

What is claimed is:

1. Apparatus for treating materials comprising foamed thermoplastic synthetic resins, said apparatus comprising
   a main body frame having a crushing room inwardly tapered towards its lower part;
   a hopper in communication with said crushing room and into which said materials are charged;
   a crushing shaft rotatably traversing said crushing room, said crushing shaft comprising a plurality of crushing vanes for crushing said materials and having a radius of gyration sufficient to extend into said hopper so as to destroy the lower layer of said materials within said hopper;
   a sending cylinder disposed in said main body frame outside of said crushing room, said sending cylinder having receipt opening means in communication with said crushing room for receiving said materials from said crushing room; said sending cylinder housing a rotatable shaft having a screw vane for moving said materials along its axial length;
   a compressing cylinder through which said rotatable shaft is partially disposed, said compression cylinder having an inlet and an outlet, said inlet being in communication with and connected in series to said sending cylinder; the diameter of said inlet being larger than the diameter of said outlet so that said compressing cylinder is tapered;
   a heating cylinder for heating said materials to a temperature lower than the temperature at which said materials completely melt, so as to soften and fuse said materials one to another, said heating cylinder having an inlet and an outlet, said inlet being in communication with said outlet of said compressing cylinder;
   extruding nozzle means in communication with said outlet of said heating cylinder for extruding said materials in an elastic state;
   rotating cutting means disposed about said extruding nozzle means for cutting said extruded materials; and
   exhausting means comprising receiving means for receiving the cut materials and gas flow means for exhausting said materials out of said apparatus.

2. The apparatus of claim 1, wherein said main body frame comprises section plates to which said crushing shaft is supported with bearings, said crushing shaft being driven by a motor positioned outside said crushing room; said plurality of crushing vanes being arranged on said crushing shaft in a plurality of series, each said series of crushing vanes being equidistant in length and being shifted about 120° in the circumferential direction from the other series of crushing vanes, each crushing vane in each of said series being slightly shifted in phase from the other crushing vanes in its series, each of said crushing vanes being provided, in opposition to rotation, with a small vane oblique in an axial line.

3. The apparatus of claim 1, wherein said main body comprises section plates to which said crushing shaft is supported with bearings, said crushing shaft being driven by a motor positioned outside said crushing room; said plurality of crushing vanes being equidistant in length; each of said crushing vanes having a cutting edge, the cutting edge of each crushing vane being shifted 60° from the cutting edges of the other crushing vanes; and wherein said crushing room further comprises a plurality of stationary cutting edges arranged in the circumferential direction of said crushing shaft so as not to interfere with the rotation thereof; each of said crushing vanes being provided, in opposition to rotation, with a small valve oblique in an axial direction.

4. The apparatus as claimed in claim 3, wherein the crushing shaft comprises a portion hexagonal in cross section, and wherein the crushing vanes are fixedly mounted thereon through hexagonal holes formed at the ends thereof and are spaced apart by means of spacers.

5. The apparatus as claimed in claim 1, wherein said main body frame comprises section plates, the sending cylinder is parallel to the crushing shaft and is supported by its both ends to the section plates; and wherein the heating cylinder communicates with said outlet of said compressing cylinder through a straight aperture in said heating cylinder; and wherein said rotatable shaft has a screw vane of large diameter in proximity to said receipt opening of the sending cylinder, and has a screw vane of a diameter continuously reducing in proximity to the compression cylinder in response to the tapered compression cylinder, and has a screw vane of small diametered cross sectional area in proximity to the heating cylinder.

6. The apparatus as claimed in claim 5, wherein the heating cylinder is encircled therearound with a heater and includes a periphery, and the aperture is formed with grooves running in the axial direction in several parts of the periphery of said heating cylinder.

7. The apparatus as claimed in claim 5, wherein the heating cylinder and the compression cylinder are encircled therearound with a heater.

8. The apparatus as claimed in claim 1, wherein the extruding nozzle means is fixed to the outlet of the heating cylinder so as to encircle the front end of the rotating shaft, and comprises an extruding hole having an outer face, and wherein a rotating cutter is rotated along the outer face of the extruding hole.

9. The apparatus as claimed in claim 8, wherein the extruding hole is provided in a radius direction of the extruding nozzle means, and a cleaning hole is formed in an axial direction of the extruding nozzle means, said extruding nozzle means further comprising a cover to close said cleaning hole.

10. The apparatus as claimed in claim 8, wherein the extruding hole is provided in a radius direction of the extruding nozzle means, and wherein said rotating cutter comprises a bearing connected to the extruding nozzle means.

11. The apparatus as claimed in claim 1, wherein the exhausting means comprises an exhausting hopper, and an air blower.

12. The apparatus as claimed in claim 1, wherein said crushing room comprises an outlet port having an opening cover.

* * * * *